United States Patent
Sterken et al.

(10) Patent No.: US 8,658,512 B2
(45) Date of Patent: Feb. 25, 2014

(54) METHOD FOR FORMING MEMS VARIABLE CAPACITORS

(75) Inventors: Tom Sterken, Ghent (BE); Geert Altena, Eindhoven (NL); Martijn Goedbloed, Aachen (DE); Robert Puers, Blanden (BE)

(73) Assignees: IMEC, Leuven (BE); Stichting IMEC Nederland, Eindhoven (NL); Katholieke Universiteit Leuven, KU Leuven R&D, Leuven (BE)

(*) Notice: Subject to any disclaimer, the term of this patent is extended or adjusted under 35 U.S.C. 154(b) by 107 days.

(21) Appl. No.: 13/382,335

(22) PCT Filed: Jul. 1, 2010

(86) PCT No.: PCT/EP2010/059362
§ 371 (c)(1),
(2), (4) Date: Mar. 22, 2012

(87) PCT Pub. No.: WO2011/003803
PCT Pub. Date: Jan. 13, 2011

(65) Prior Publication Data
US 2012/0171836 A1    Jul. 5, 2012

Related U.S. Application Data

(60) Provisional application No. 61/223,225, filed on Jul. 6, 2009.

(51) Int. Cl.
*H01L 21/20* (2006.01)
(52) U.S. Cl.
USPC ............ 438/393; 438/381; 438/386; 438/396
(58) Field of Classification Search
None
See application file for complete search history.

(56) References Cited

U.S. PATENT DOCUMENTS

| | | | |
|---|---|---|---|
| 2002/0005976 A1* | 1/2002 | Behin et al. | 359/254 |
| 2002/0093038 A1 | 7/2002 | Ikeda et al. | |
| 2002/0171517 A1* | 11/2002 | Guo et al. | 333/262 |

(Continued)

OTHER PUBLICATIONS

Sterken et al., "Harvesting Energy from Vibrations by a Micromachined Electret Generator," IEEE Solid-State Sensors, Actuators, and Microsystems Conference 2007, Jun. 10, 2007, pp. 129-132.

Bakri-Kassem et al., "Two Movable-Plate Nitride-Loaded MEMS Variable Capacitor," IEEE Transactions on Microwave Theory and Techniques, vol. 52, No. 3, Mar. 2004, pp. 831-837.

International Search Report, International Application No. PCT/EP2010/059362 dated Oct. 1, 2010.

(Continued)

*Primary Examiner* — Michael Jung
*Assistant Examiner* — Jay C Chang
(74) *Attorney, Agent, or Firm* — McDonnell Boehnen Hulbert & Berghoff LLP

(57) ABSTRACT

A method for fabricating an out-of-plane variable overlap MEMS capacitor comprises: providing a substrate (40) comprising a first layer (41), a second layer (42), and a third layer (43) stacked on top of one another; and etching a plurality of first trenches (70) through the third layer (43), through the second layer (42), and into the first layer (41) using a single etching mask. Etching the plurality of first trenches (70) defines a plurality of first fingers (51) in the third layer (43) and a plurality of second fingers (52) in the first layer (41). By using a single mask, the process is self-aligned. The method further comprises removing the second layer (42) in a first region where the plurality of first trenches (70) are provided, thereby forming a spacing or gap between the plurality of first fingers (51) and the plurality of second fingers (52).

16 Claims, 3 Drawing Sheets

(56) References Cited

U.S. PATENT DOCUMENTS

2004/0145056 A1* 7/2004 Gabriel et al. ............... 257/758
2006/0228066 A1* 10/2006 Ravnkilde et al. ............. 385/14
2008/0100670 A1* 5/2008 Hoisington et al. ........... 347/54
2009/0026561 A1 1/2009 Reichenbach et al.

OTHER PUBLICATIONS

G. Altena et al., "Electrostatic energy scavengers for wireles autonomous sensor nodes", Smart Systems Integration 2007, proceedings of the 1st European Conference and Exhibition on Integration Issues of Miniaturized Systems—MEMS, MOEMS, ICs and Electronic Components, pp. 359-366, Mar. 2007.

* cited by examiner

METHOD FOR FORMING MEMS VARIABLE CAPACITORS

CROSS-REFERENCE TO RELATED APPLICATIONS

The present application is a U.S. national stage application of International Patent Application No. PCT/EP2010/059362 filed Jul. 1, 2010, which claims priority to U.S. Provisional Application 61/223,255 filed Jul. 6, 2009.

FIELD OF THE INVENTION

The present invention relates to the field of energy harvesters, more particularly electrostatic energy harvesters. In particular, the present invention relates to MEMS (MicroElectroMechanical Systems) variable capacitors and to methods for fabricating such MEMS variable capacitors.

BACKGROUND OF THE INVENTION

Future wireless sensor networks will comprise sensor nodes which occupy a volume of typically a few $cm^3$. The scaling down of batteries for powering these sensor nodes faces technological restrictions as well as a loss in storage density. Replacing or recharging the batteries at regular time intervals, for example every month, would be very expensive or even impossible, for example in distributed or implanted systems. Energy scavengers based on the recuperation of wasted ambient energy are a possible alternative to batteries. Several scavenger concepts have been proposed, based on the conversion of light energy (using solar cells), thermal energy (thermoelectric generators), pressure energy, or kinetic energy.

Kinetic energy scavengers convert energy in the form of mechanical movement (e.g. in the form of vibrations or random displacements) into electrical energy. For the conversion of kinetic energy into electrical energy, different conversion mechanisms may be employed, for example based on piezoelectric, electrostatic, or electromagnetic mechanisms. Piezoelectric scavengers employ active materials that generate a charge when mechanically stressed. Electrostatic scavengers utilize the relative movement between electrically isolated charged capacitor plates to generate energy. Electromagnetic scavengers are based on Faraday's law of electromagnetic induction and generate electrical energy from the relative motion between a magnetic flux gradient and a conductor.

Electrostatic energy conversion is based on a variable capacitance structure that is driven by mechanical vibrations and oscillates between a maximum capacitance and a minimum capacitance. Movement of a seismic mass resulting from external vibrations is translated into a change of the capacitance and thus into a change of the charge on the capacitor. This results in an electrical current through a load circuit, and thus a conversion of kinetic energy into electrical energy. In micromachined electrostatic scavengers the relative movement between electrically isolated capacitor plates is obtained by providing a fixed electrode and a movable electrode (i.e. movable relative to the fixed electrode). Often the movable electrode and the fixed electrode comprise a plurality of shallow capacitor plates in parallel, called fingers. The fingers of both electrodes may be interdigitated or not. A seismic mass may be attached to the movable electrode.

The fixed electrode and the movable electrode may be located in a same plane ('in-plane'). Relative movement between the capacitor plates may then comprise changing the overlap area of the fingers (in-plane variable overlap capacitor) or changing the gap between the fingers (in-plane gap-closing capacitor). Alternatively, the fixed electrode and the movable electrode may be located in different planes ('out-of-plane'), with a spacing or gap in between both electrodes. Relative movement between the capacitor plates may comprise changing the gap between two large plates (out-of-plane gap closing capacitor) or changing the overlap between a plurality of fingers (out-of-plane variable overlap capacitor).

The out-of-plane variable overlap approach allows a larger displacement of the seismic mass and a larger capacitance change as compared to the in-plane overlap approach, and offers a reduced susceptibility to the pull-in effect as compared to gap-closing capacitors. The fixed electrode and the movable electrode of an out-of-plane variable overlap capacitor form a plurality of parallel-plate capacitors that are connected in parallel.

In prior art systems such an out-of-plane variable overlap structure is fabricated based on at least two substrates, as e.g. reported by G. Altena et al. in "Electrostatic energy scavengers for wireless autonomous sensor nodes", Smart Systems Integration 2007, proceedings of the 1$^{st}$ European Conference and Exhibition on Integration Issues of Miniaturized Systems—MEMS, MOEMS, ICs and Electronic Components, pages 359-366, March 2007. FIG. 1 shows a cross section of such a prior art out-of-plane variable overlap capacitor structure. The structure comprises a fixed electrode comprising a plurality of fixed fingers 11 formed on a first substrate 10, for example a glass substrate or any other suitable substrate. It further comprises a movable electrode comprising a plurality of movable fingers 21 and a seismic mass 22 physically attached to the movable electrode. The movable fingers 21 and the seismic mass 22 are made from a second substrate 20, e.g. a silicon substrate or any other suitable substrate. The movable electrode of the capacitor is for example bulk micromachined together with the mass 22 and the suspensions (not illustrated in FIG. 1). The first substrate 10 and the second substrate 20 are adhesively bonded to each other with an adhesive 31, for example with a photosensitive BCB layer. Often a third substrate is added (not illustrated in FIG. 1), bonded to the second substrate 20 at a side opposite to the side where the first substrate 10 is bonded. This third substrate can be used to package the MEMS structure, possibly in vacuum to reduce damping losses. The third substrate can also be used as a means to polarize the capacitor, either using an electrode or an electret.

Fabrication of such a prior art out-of-plane variable overlap capacitor is relatively complex, requiring at least two substrates 10, 20, at least four patterning steps (two per substrate) and a wafer bonding step with good alignment between the fixed fingers 11 on the first substrate 10 and the movable fingers 21 on the second substrate 20. The size of the gap 32 between the fixed electrode and the movable electrode of the capacitor can be controlled down to 1 micrometer by tuning the thickness of the adhesive 31. Variations in the gap 32 can occur, in case of thickness non-uniformities in the adhesive layer, e.g. resulting from spincoating the adhesive on a substrate with topography. The performance of the capacitor may depend on the accuracy of the alignment of the wafer bonding procedure, mainly on the accuracy of the rotational alignment. Furthermore, the yield depends on the amount of bonding defects after wafer bonding.

SUMMARY OF THE INVENTION

It is an aim of the present invention to provide a method for fabricating an out-of-plane variable overlap MEMS capacitor structure wherein the method is less complex than prior art methods.

The above aim is accomplished by a method according to the present invention.

A method according to embodiments the present invention allows fabricating an out-of-plane variable MEMS capacitor based on a single substrate and using less processing steps, e.g. less patterning steps, as compared to prior art methods. In embodiments of the present invention the need for a wafer bonding step is avoided, leading to a better reliability and a higher yield as compared to prior art methods. A method according to embodiments of the present invention allows accurate alignment ('self-alignment') between the fixed fingers of a fixed electrode and the movable fingers of a movable electrode and leads to a well controlled gap between the fixed electrode and the movable electrode.

A method for fabricating an out-of-plane variable overlap MEMS capacitor according to embodiments of the present invention comprises: providing a substrate comprising a first layer, a second layer, and a third layer stacked on top of each other; and etching a plurality of first trenches through the third layer, through the second layer, and into the first layer using a single etching mask. Etching the plurality of first trenches defines a plurality of first fingers in the third layer and a plurality of second fingers in the first layer.

The method may further comprise removing the second layer in a first region where the plurality of first trenches are provided, thereby forming a spacing or gap, e.g. an air or gas gap, between the plurality of first fingers and the plurality of second fingers. The air gap may remain vacuum or may be filled with a gas. The first region is defined as a 2-dimensional area in a plane parallel to the plane of the layers of the substrate, which 2-dimensional area covers the location of the substrate where the first trenches are provided.

The method may further comprise etching second trenches through the first layer in a second region surrounding the first region where the plurality of first trenches are provided, thereby defining a seismic mass connected to the plurality of second fingers. The second region also is a 2-dimensional area in a plane parallel to the plane of the layers of the substrate, and the second region is not smaller than the first region.

The method may further comprise removing the second layer in a region between the seismic mass and the third layer, thereby releasing the seismic mass and the plurality of second fingers from the remainder of the structure such that the seismic mass and the plurality of second fingers can move relative to the plurality of fixed fingers, e.g. in response to external vibrations.

The thickness of the first layer can for example be in the range between 100 micrometer and 1000 micrometer, between 200 micrometer and 800 micrometer, or between 500 micrometer and 700 micrometer.

The thickness of the second layer can for example be in the range between 1 micrometer and 5 micrometers or between 1 micrometer and 3 micrometers, including for example, 2 micrometers.

The thickness of the third layer can for example be in the range between 10 micrometer and 100 micrometer, between 10 micrometer and 50 micrometer, between 10 micrometer and 30 micrometer, for example 20 micrometer.

The substrate may for example be an SOI substrate, wherein the first layer is the handling layer of the SOI substrate, the second layer is the buried oxide layer of the SOI substrate, and the third layer is the device layer of the SOI substrate.

A method according to embodiments of the present invention can advantageously be used in a fabrication process of energy scavenging devices or in a fabrication process of sensors, e.g. acceleration sensors.

The subject matter regarded as invention is particularly pointed out and distinctively claimed in the claim section concluding this document. The invention, both as to organization and method of operation, together with features and advantages thereof, may best be understood by reference to the following detailed description when read with the accompanying drawings.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Figure 1:
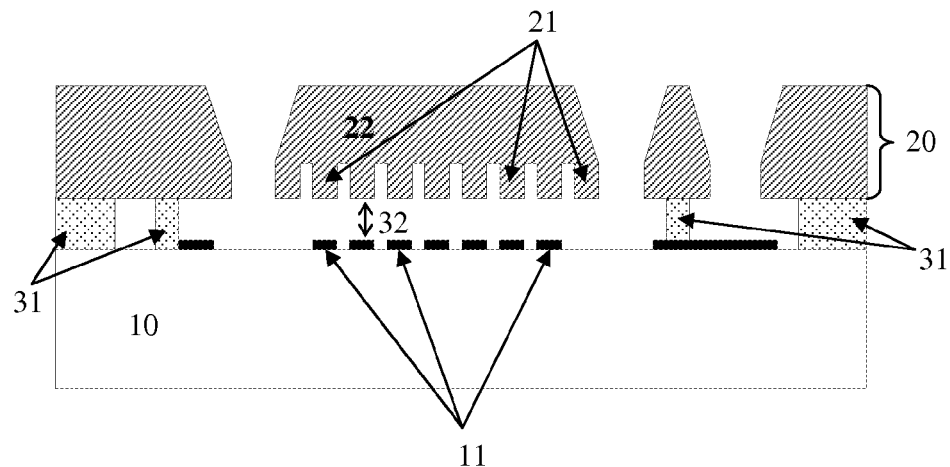
FIG. 1 shows a cross section of a prior art out-of-plane variable overlap capacitor structure.

In the different drawings, the same reference signs refer to the same or analogous elements. Any reference signs in the claims shall not be construed as limiting the scope.

DETAILED DESCRIPTION OF ILLUSTRATIVE EMBODIMENTS

The presently disclosed method and device will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this invention, in one or more embodiments.

Similarly it should be appreciated that in the description of exemplary embodiments of the invention, various features are sometimes grouped together in a single embodiment, figure, or description thereof for the purpose of streamlining the invention and aiding in the understanding of one or more of the various aspects of the invention. This method of invention, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those of skill in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures, and techniques have not been shown in detail in order not to obscure an understanding of this description.

The disclosed method and device will now be described by a detailed description of several embodiments of the invention. It is clear that other embodiments of the invention can be configured according to the knowledge of persons skilled in the art without departing from the technical teaching of the invention, the invention being limited only by the terms of the appended claims.

It is an aim of the present invention to provide a method for fabricating an out-of-plane variable overlap MEMS capacitor structure wherein the method is less complex and requires less processing steps (e.g. less patterning steps and/or less lithographic steps) than prior art methods and wherein the need for yield-reducing steps such as wafer bonding is avoided. Therefore the fabrication method of the present invention can be cheaper and can have a higher yield as compared to prior art methods.

Figure 3:
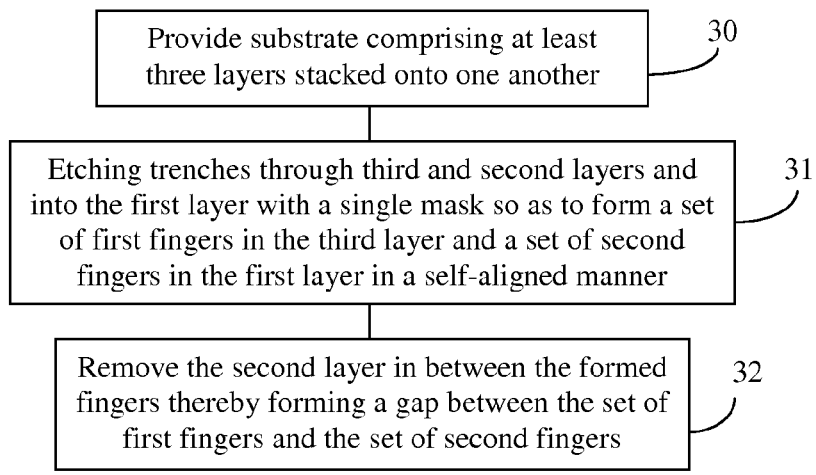
FIG. 3 is a flow chart illustrating a method according to embodiments of the present invention.

This aim is achieved by fabricating the out-of-plane variable overlap capacitor structure according to embodiments of the present invention, as schematically illustrated in FIG. 3, starting from a single substrate comprising at least three layers, a first layer, a second or intermediate layer and a third layer stacked on top of each other (step 30), such as for example an SOI (Silicon-On-Insulator) substrate. The first layer of the stack of layers is used for forming a movable electrode and a seismic mass; the thickness of the second layer or intermediate layer of the stack of layers defines a gap between the movable electrode and a fixed electrode; and the third layer of the stack of layers is used for forming the fixed electrode. The method according to embodiments of the present invention comprises etching trenches through the third and second layers and into the first layer (step 31) with a single mask, so as to form a set of first fingers in the third layer and a set of second fingers in the first layer in a self-aligned manner. In accordance with embodiments of the present invention, the fixed electrode may comprise a plurality of fixed fingers, e.g. rectangular fingers, that are arranged parallel to each other and the movable electrode may comprise a plurality of movable fingers, e.g. rectangular fingers, that are arranged parallel to each other. In particular embodiments, the number and position of the fixed fingers corresponds to the number and position of the movable fingers. The movable fingers (and a seismic mass attached to the movable fingers) can move relative to the fixed fingers, e.g. in response to external vibrations. Instead of a parallel arrangement of fingers, in alternative embodiments of the present invention, other configurations are possible, such as for example a configuration wherein the fingers are positioned radially (like spokes of a wheel) and wherein the relative movement of the movable fingers with respect to the fixed fingers is a rotation. In general, the orientation of the fingers is substantially perpendicular to the motion direction of the movable electrode.

In a method according to embodiments of the present invention, due to the use of a substrate comprising at least three layers and a single mask for defining the sets of first and second fingers, the need for a wafer bonding step is avoided, leading to a better reliability and a higher yield as compared to prior art methods.

A method according to embodiments of the present invention allows accurate alignment ('self-alignment') between the plurality of fixed fingers of the fixed electrode and the plurality of movable fingers of the movable electrode. Alignment between the plurality of fixed fingers and the plurality of movable fingers is obtained by forming the fingers by anisotropic etching of a plurality of first trenches in the substrate completely through the third layer and the second layer and partially into the first layer, using a single etching mask. In this way the plurality of fixed fingers and the plurality of movable fingers are 'self-aligned', meaning that the fabrication process itself results in alignment between the fixed fingers and the movable fingers, and that the need for a specific alignment step is avoided.

In embodiments of the present invention a good control of the gap between the fixed electrode and the movable electrode is obtained by controlling the thickness and thickness uniformity of the second, intermediate layer in the single substrate, e.g. SOI substrate. As described further, removing the second, intermediate layer in an area between the fixed electrode and the movable electrode forms the gap (step 32). For example, when an SOI (Silicon On Insulator) substrate is used for forming the capacitor structure, the intermediate layer may be formed by a buried oxide (BOX) layer of the SOI substrate. The BOX layer consists of a layer of thermal silicon oxide grown on either the handle layer (first layer) or the device layer (third layer), and has a very controlled and uniform thickness over the substrate area.

In embodiments of the present invention, the gap between the fixed electrode and the movable electrode can for example be an air gap or a vacuum gap. However, other materials can fill the gap such as for example a gas or a liquid, provided that the material in the gap has suitable electrical properties and allows the desired movement of the movable electrode. The use of vacuum allows reducing the energy losses due to friction and air or gas compression.

The present invention is further described for the exemplary embodiment wherein an SOI wafer or substrate is used for fabricating an out-of-plane variable overlap capacitor structure. When using an SOI substrate, the handling layer is used as the first layer for forming the movable electrode and the seismic mass; the buried insulating layer, e.g. silicon oxide layer, is used as the second layer for defining the gap between the fixed electrode and the movable electrode and the device layer, in this embodiment a silicon layer, is used as the third layer for forming the fixed electrode.

Substrates other than SOI can also be used to fabricate an out-of-plane variable capacitor according to embodiments of the present invention. In embodiments of the present invention any suitable substrate comprising at least three layers stacked on top of each other can be used. The second layer or intermediate layer is a layer that can be removed selectively with respect to the other layers, for example by isotropic etching. The second layer may be an insulator layer. The first layer and the third layer may be electrically conductive and can be patterned, e.g. etched, with substantially straight sidewalls in a selective way with respect to the intermediate layer. For example, in embodiments of the present invention the intermediate layer can comprise a polymer such as for example BCB (benzocyclobutene) or SU-8. For example, a substrate can be formed by bonding a first layer without topography and a second layer without topography by means of a polymer layer, e.g. a spin-coated polymer layer. Because of the absence of topography on the second and third layer a good thickness control of the polymer layer can be obtained. The polymer layer can act as an etch stop layer during etching of the first and/or third layer and can easily be removed for release, for example by $O_2$ or $O_2/CF_4$ etching. As an example, in embodiments of the present invention the first and third electrically conductive layers could comprise a semiconductor material that can be patterned by dry etching or it can comprise a metal that can be patterned e.g. by laser ablation. In particular embodiments of the present invention, single crystalline silicon is preferred as a material for the first layer and the third layer because it allows realising high Q resonators that are insensitive to creep and fatigue and that are therefore very reliable and can have a long lifetime.

The thickness of the first layer is preferably as large as possible, taking into account limitations related to the etching process used for patterning this layer. The thicker the first layer, the larger the seismic mass can be for a given capacitor area. For example, the thickness of the first layer can be in the range between 100 micrometer and 1000 micrometer, e.g. in the range between 200 micrometer and 800 micrometer, e.g. in the range between 500 micrometer and 700 micrometer. However, the invention is not limited thereto.

The thickness of the third layer can for example be in the range between 10 micrometer and 100 micrometer, for example in the range between 10 micrometer and 50 micrometer, for example in the range between 10 micrometer and 30 micrometer, for example 20 micrometer. However, the invention is not limited thereto. The thickness of the third layer may be selected in function of processing properties, such as for example reliability of the etching process used for patterning this layer.

The intermediate layer is preferably sufficiently thin for providing a good energetic coupling between mechanical energy and electrical energy, without increasing the risk of sticking of the movable electrode to the fixed electrode. For example, the thickness of the second layer or intermediate layer can be in the range between 1 micrometer and 5 micrometer, for example in the range between 1 micrometer and 3 micrometer, for example 2 micrometer. However, the invention is not limited thereto.

A method according to embodiments of the present invention for fabricating an out-of-plane variable overlap capacitor structure can for example be used as part of a fabrication process for energy harvesting or scavenging devices. The MEMS variable capacitors can also be used in other applications, such as for example for tuning and switching purposes in RF devices and in sensing applications or in e.g. accelerometers.

A fabrication method according to an embodiment of the present invention is illustrated in FIGS. 2(a)-2(g). The method illustrated is based on using an SOI wafer and DRIE (Deep Reactive Ion Etching) etching of first trenches through the device layer (third layer) of the SOI wafer, through the buried oxide layer (second layer) and partly into the handling layer (first layer) using a single etching mask, followed by a release etch. As opposed to prior art solutions wherein two separate substrates are used, each comprising one electrode of the variable capacitor, in the method of embodiments of the present invention a single SOI (Silicon-on-Insulator) substrate is used wherein one of the electrodes (for example the movable electrode with the mass) is fabricated in the handling layer (first layer) of the SOI substrate and wherein the other electrode (preferably the fixed electrode) is fabricated in the device layer (third layer) of the SOI substrate. By using the SOI substrate, the two electrodes can be fabricated using a single lithographic step, thus self-aligning the fingers of both electrodes with respect to each other and eliminating the need for wafer bonding. The required vertical separation (also called 'gap') between the two capacitor plates comprising the fingers is provided by the buried oxide layer which is locally removed between the fingers for creating a released mechanical structure, for example by etching.

Figure 2A:
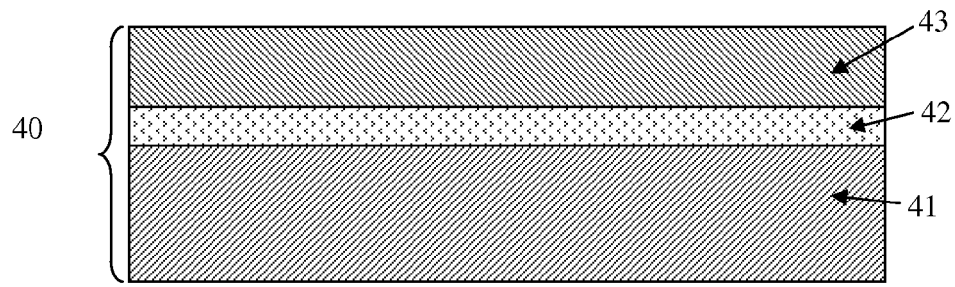
FIGS. 2(a)-2(g) illustrate a fabrication process according to an embodiment of the present invention.

As illustrated in FIG. 2(a), the method of embodiments of the present invention starts with a SOI substrate 40 comprising a thick semiconductor, e.g. silicon, handling layer 41 with a thin buried insulation layer, e.g. oxide layer, 42 and a thin semiconductor, e.g. silicon, device layer 43 on top of the buried oxide layer 42. The thickness of the handling layer 41 may for example be in the order of 625 micrometer, the thickness of the insulation layer 42 can for example be 2 micrometer and the device layer 43 can for example be 20 micrometer thick.

Figure 2B:
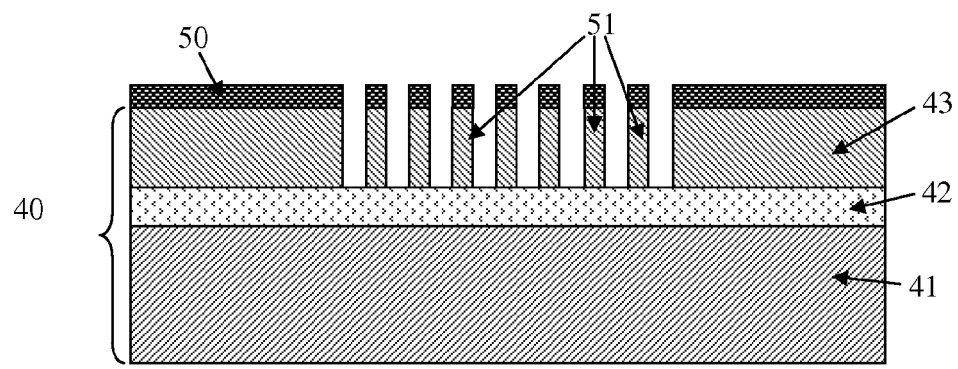

FIG. 2(b) illustrates the formation of a first electrode, e.g. fixed electrode, comprising a plurality of first fingers 51, e.g. fixed fingers, in the device layer 43 of the SOI substrate 40. Formation of the first electrode can comprise forming a first mask 50, e.g. a lithographic mask, on the device layer 43 and performing an anisotropic etching step to create deep, steep-sided trenches in the device layer. As an example, a DRIE (Dry Reactive Ion Etching) step may be performed through the device layer 43 until the insulation layer, e.g. oxide layer 42 is reached. It is particularly advantageous to use DRIE etching, because this allows forming a plurality of trenches with substantially straight sidewalls through the device layer 43. During etching, the insulation layer, e.g. silicon oxide layer 42, acts as an etch stop layer. For the DRIE etching step, in one embodiment the "Bosch process" can be used, a process wherein a standard, nearly isotropic plasma etching step (e.g. with a $SF_6/O_2$ plasma) and a passivation layer, e.g. polymer, deposition step (e.g. with a $C_4F_8$ plasma) are alternated repeatedly. Alternatively, a cryogenic etch process with for example a continuous $SF_6/O_2$ plasma at low temperature (e.g. −110° C.) can be used.

Figure 2C:
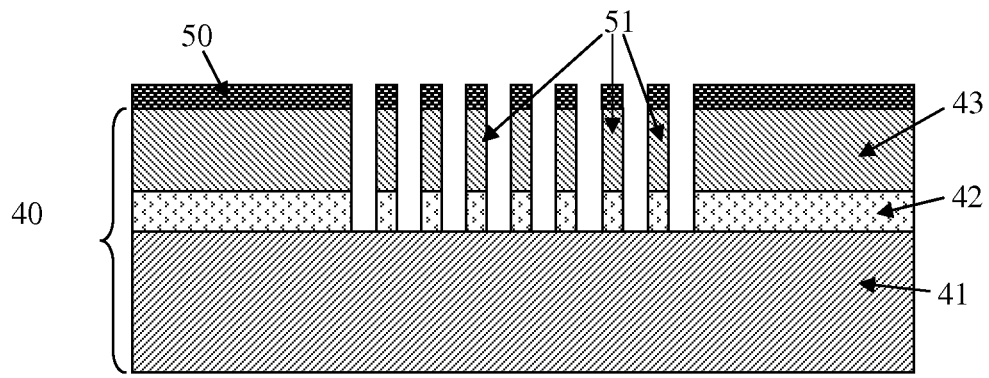

In a next step, illustrated in FIG. 2(c), using the same first mask 50, the buried insulation layer, e.g. oxide layer 42, is removed in the trenches already formed. Removing the insulation layer 42 can be done by etching. This etching step can for example be a RIE (Reactive Ion Etching) step, e.g. with a $CHF_3$ plasma, until the handling layer 41 of the SOI substrate 40 is reached. The handling layer 41 acts as an etch stop layer for the RIE etch.

Figure 2D:
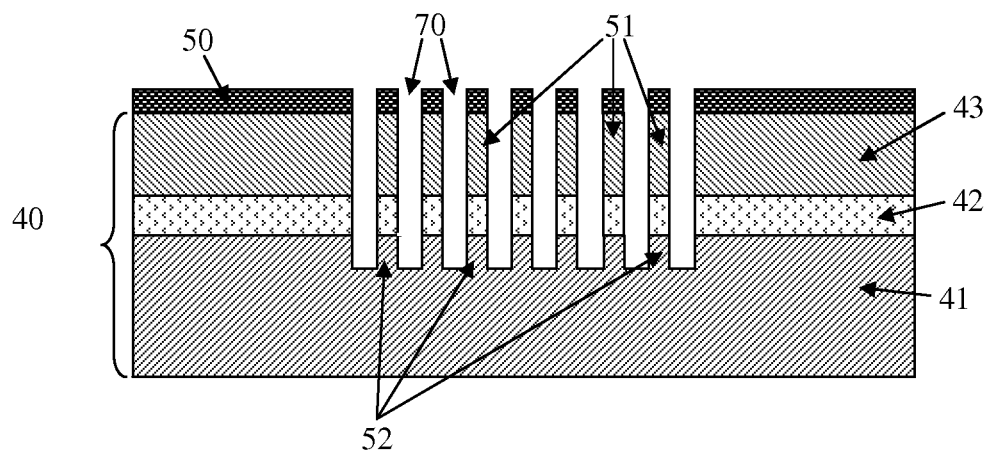
Figure 2E:
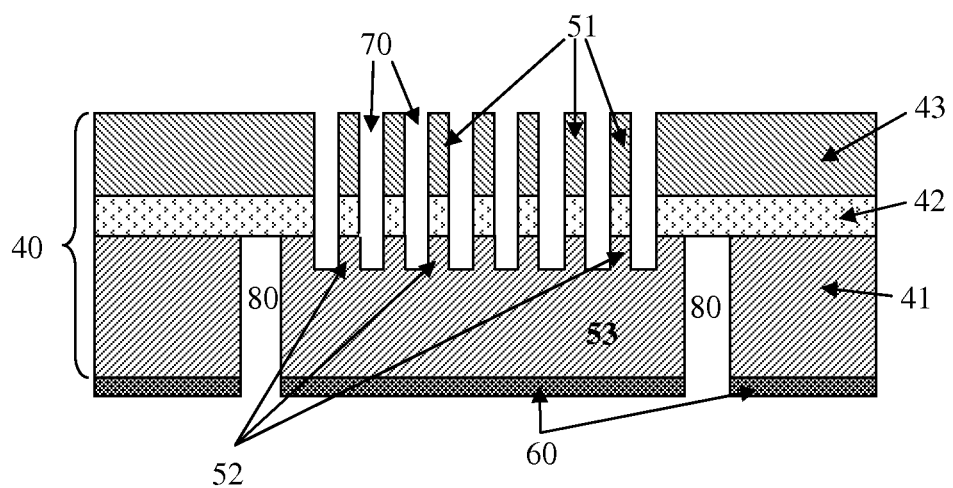

After that, again using the same first mask 50, the handling layer 41 is partially removed at the bottom of the trenches already formed, e.g. to a depth of a few micrometer, e.g. 10 micrometer, as illustrated in FIG. 2(d). The partial removal of the handling layer 41 may be obtained by etching. This etching step can for example be a DRIE etching step. Partial removal of the handling layer 41 material at the bottom of the trenches is performed for defining a second electrode, e.g. movable electrode, comprising a plurality of second fingers 52, e.g. movable fingers. For the DRIE etching step the "Bosch process" can be used, that repeatedly alternates between a standard, nearly isotropic plasma etching step, for example with a $SF_6/O_2$ plasma, and a passivation layer, e.g. polymer, deposition step, e.g. with a $C_4F_8$ plasma. Alternatively, a cryogenic etch process with for example a continuous $SF_6/O_2$ plasma at low temperature (e.g. −110° C.) can be used.

As illustrated in FIG. 2(d), this results in a plurality of first trenches 70 through the device layer 43, through the buried insulation layer, e.g. oxide layer, 42, and into the handling layer 43. After this step the first mask 50 can be removed in any suitable way, for example by $O_2$ plasma etching. However, the first mask 50 can also be removed in a later stage of the process.

The method according to embodiments of the present invention further comprises etching second trenches 80 through the handling layer 41 from the rear side of the SOI substrate 40, i.e. the side of the SOI substrate 40 opposite to the side where the plurality of first trenches 70 are present. Etching through the handling layer 41 can for example be done by DRIE etching (e.g. using the Bosch process or by cryogenic etching) using a second mask 60 provided at the rear side of the substrate 40. The second mask 60, such as e.g. a $SiO_2$ mask, can already be provided, but does not need to be provided, at the beginning of the fabrication process (e.g. before providing the first mask 50). The etching step through the handling layer 41 continues until the buried insulation layer, e.g. silicon oxide layer 42, is reached and defines the seismic mass 53 (FIG. 2(e)), suspension elements (not shown) and anchor points (not shown). Anchor points and suspension elements are provided for flexibly connecting the seismic mass 53 to the handling layer 41. The second mask 60 at the rear side of the SOI substrate 40 is such that the locations where second trenches 80 are etched through the handling layer 41 span an area that at least covers the area where the plurality of first trenches 70 are present. Alignment between the second mask 60 and the area where the plurality of first trenches 70 (defining the plurality of fingers 51, 52) are located can for example be done using a mask aligner with backside microscope. The accuracy requirements for this alignment are low. The main requirement is that, in a plane parallel to the substrate surface, the area covered by the plurality of first trenches 70 is within the area covered by the mass 53.

Figure 2F:
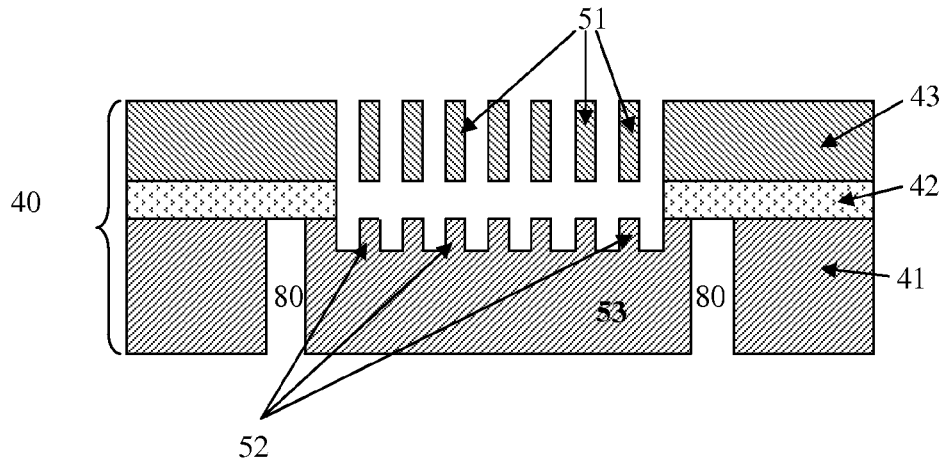

Next, as illustrated in FIG. 2(f), a first release step is performed wherein the buried insulation layer, e.g. silicon oxide layer 42, is removed in a region in between the plurality of first fingers 51 and the plurality of second fingers 52. The release step may for example comprise removing the buried insulation layer 42 by means of vapor HF provided at the front side (i.e. the side of the plurality of first fingers 51) of the structure. Removal of the buried insulation layer, e.g. silicon dioxide layer, in a region between the plurality of first fingers 51 and the plurality of second fingers 52 results in the formation of a gap or spacing between the fixed electrode and the movable electrode.

Figure 2G:
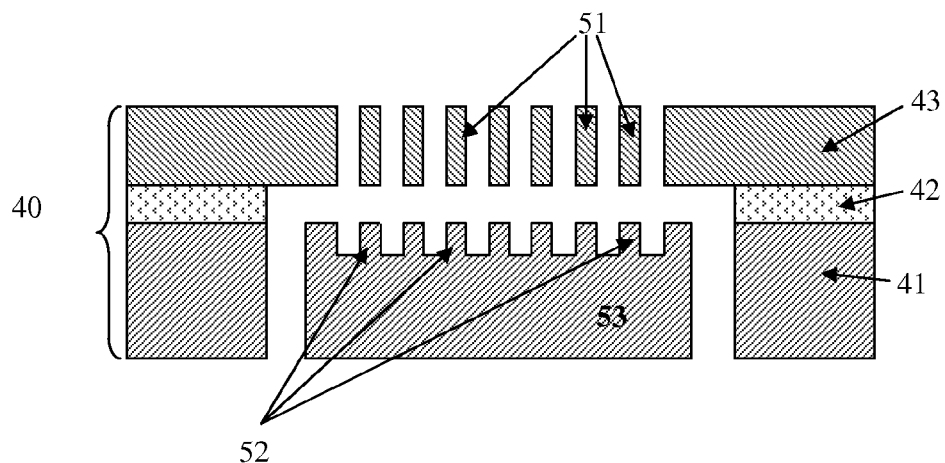

Finally, a second release step is performed (FIG. 2(g)) wherein the buried insulation layer, e.g. silicon oxide layer 42, is further removed in a region in between the seismic mass 53 and the device layer 43, thereby releasing the seismic mass 53 and the second, movable electrode, such that the seismic mass and the movable electrode can move relative to the fixed electrode. The second release step can be performed by means of vapor HF provided at the rear side of the structure.

In alternative embodiments, the order of the two release steps can be reversed, i.e. first the second release step can be performed and next the first release step can be performed. After performing both release steps the seismic mass 53 is still connected to the handling layer 41 by means of suspension elements (not shown). It is an advantage of using vapor HF in the first release step and the second release step that sticking problems that may occur in wet processing are avoided.

As illustrated in FIGS. 2(a)-2(g), a method for fabricating an out-of-plane variable overlap MEMS capacitor structure according to embodiments of the present invention only requires one wafer and two lithographic steps (one at each side of the substrate). This is an advantage as compared to prior art methods, wherein two substrates are used that are attached to each other by means of wafer bonding and wherein four lithographic steps are used (two per substrate).

The invention claimed is:

1. A method, comprising:
   providing a substrate, wherein the substrate comprises a first layer, a second layer, and a third layer and wherein the first layer, the second layer, and the third layer are stacked on each other;
   etching a plurality of first trenches through the third layer, through the second layer, and into the first layer to define a plurality of first fingers in the third layer and a plurality of second fingers in the first layer, wherein the etching comprises using a single etching mask;
   removing the second layer in a region where the plurality of first trenches are provided to form a gap between the plurality of first fingers and the plurality of second fingers;
   etching second trenches through the first layer in a region surrounding the region where the plurality of first trenches are provided, to define a seismic mass connected to the plurality of second fingers; and
   removing the second layer in a region between the seismic mass and the third layer, thereby releasing the seismic mass and the plurality of second fingers.

2. The method of claim 1, wherein the plurality of first fingers comprises a first electrode and the plurality of second fingers comprises a second electrode and wherein the gap between the first electrode and the second electrode forms a capacitance.

3. The method of claim 2, wherein the first electrode is configured to move with respect to the second electrode to vary the capacitance.

4. The method of claim 1, wherein etching the plurality of first trenches comprises a reactive ion etch process.

5. The method of claim 1, wherein etching the plurality of first trenches comprises a Bosch etch process.

6. The method of claim 1, wherein removing the second layer comprises a reactive ion etch process.

7. The method of claim 1, wherein removing the second layer comprises etching with hydrofluoric acid vapor.

8. The method of claim 1, wherein the first layer comprises a first thickness between 100 micrometers and 1000 micrometers.

9. The method of claim 1, wherein the second layer comprises a second thickness between 1 micrometers and 5 micrometers.

10. The method of claim 1, wherein the third layer comprises a third thickness between 10 micrometers and 100 micrometers.

11. The method of claim 1, wherein the substrate is a silicon-on-insulator substrate.

12. The method of claim 1, wherein the first layer comprises silicon, the second layer comprises silicon oxide, and the third layer comprises silicon.

13. The method of claim 1, wherein the first layer comprises silicon, the second layer comprises a polymer, and the third layer comprises silicon.

14. The method of claim 1, further comprising manufacturing an out-of-plane variable microelectromechanical capacitor.

15. The method of claim 1, further comprising manufacturing an energy scavenging device.

16. The method of claim 1, further comprising manufacturing a sensor.

* * * * *

UNITED STATES PATENT AND TRADEMARK OFFICE
CERTIFICATE OF CORRECTION

PATENT NO. : 8,658,512 B2
APPLICATION NO. : 13/382335
DATED : February 25, 2014
INVENTOR(S) : Sterken et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 184 days.

Signed and Sealed this

Twenty-ninth Day of September, 2015

Michelle K. Lee
*Director of the United States Patent and Trademark Office*